(12) United States Patent
Ouderkirk

(10) Patent No.: US 9,122,140 B2
(45) Date of Patent: Sep. 1, 2015

(54) REFRACTIVE POLARIZATION CONVERTER AND POLARIZED COLOR COMBINER

(75) Inventor: Andrew J. Ouderkirk, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 238 days.

(21) Appl. No.: 13/997,728

(22) PCT Filed: Dec. 22, 2011

(86) PCT No.: PCT/US2011/066718
§ 371 (c)(1),
(2), (4) Date: Jun. 25, 2013

(87) PCT Pub. No.: WO2013/095482
PCT Pub. Date: Jun. 27, 2013

(65) Prior Publication Data
US 2013/0335708 A1 Dec. 19, 2013

Related U.S. Application Data

(60) Provisional application No. 61/428,032, filed on Dec. 29, 2010.

(51) Int. Cl.
*G03B 21/14* (2006.01)
*G03B 21/20* (2006.01)
*H04N 9/31* (2006.01)
*G02B 27/28* (2006.01)

(52) U.S. Cl.
CPC ............ *G03B 21/2073* (2013.01); *G02B 27/28* (2013.01); *G02B 27/283* (2013.01); *G03B 21/208* (2013.01); *H04N 9/3152* (2013.01)

(58) Field of Classification Search
CPC ...... G03B 21/14; G03B 21/142; G03B 21/20; G03B 21/2073; G03B 21/208; H04N 9/31; H04N 9/3152; H04N 9/317; G02B 27/28; G02B 27/283
See application file for complete search history.

(56) References Cited

U.S. PATENT DOCUMENTS

| 4,446,305 | A | 5/1984 | Rogers |
| 5,157,458 | A | 10/1992 | Wagner |
| 6,075,647 | A * | 6/2000 | Braun et al. ................. 359/578 |
| 6,373,630 | B1 | 4/2002 | Lee |
| 6,393,039 | B1 | 5/2002 | Damask |
| 6,480,331 | B1 * | 11/2002 | Cao ......................... 359/484.04 |
| 6,563,641 | B2 * | 5/2003 | Zhao ....................... 359/484.07 |
| 6,643,064 | B2 | 11/2003 | Huang |

(Continued)

FOREIGN PATENT DOCUMENTS

| CN | 2638088 | 9/2004 |
| EP | 0814361 | 12/1997 |

(Continued)

*Primary Examiner* — Jori S Reilly-Diakun
(74) *Attorney, Agent, or Firm* — Yen T. Florczak

(57) ABSTRACT

The disclosure generally relates to refractive polarization converters, polarized color combiners using the refractive polarization converters, and in particular polarized color combiners using the refractive polarization converters that can be useful in small size format projectors such as pocket projectors. The disclosed refractive polarization converters include at least one birefringent prism that can separate an unpolarized light beam into divergent polarized light beams having orthogonal polarization directions.

20 Claims, 10 Drawing Sheets

(56) References Cited

U.S. PATENT DOCUMENTS

| | | |
|---|---|---|
| 6,697,198 B2 | 2/2004 | Tai |
| 6,711,311 B2 | 3/2004 | Delisle |
| 7,006,287 B2 | 2/2006 | Chen |
| 7,035,497 B2 * | 4/2006 | Li et al. ............... 385/16 |
| 7,167,311 B2 | 1/2007 | Brasen |
| 7,362,507 B2 | 4/2008 | Duncan |
| 7,529,029 B2 | 5/2009 | Duncan |
| 2003/0058516 A1 | 3/2003 | Scott |
| 2004/0008932 A1 | 1/2004 | Peng |
| 2008/0285129 A1 | 11/2008 | Magarill |
| 2013/0169893 A1 * | 7/2013 | Ouderkirk et al. ............ 349/8 |
| 2013/0169937 A1 * | 7/2013 | Ouderkirk et al. ............ 353/20 |

FOREIGN PATENT DOCUMENTS

| | | |
|---|---|---|
| JP | 01265206 | 10/1989 |
| WO | WO 2007-016015 | 2/2007 |
| WO | WO 2011-146266 | 11/2011 |
| WO | WO 2011-146267 | 11/2011 |
| WO | WO 2011-146569 | 11/2011 |
| WO | WO 2012-039895 | 3/2012 |
| WO | WO 2012-039993 | 3/2012 |
| WO | WO 2012-039995 | 3/2012 |
| WO | WO 2012-091972 | 7/2012 |

* cited by examiner

REFRACTIVE POLARIZATION CONVERTER AND POLARIZED COLOR COMBINER

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Still other projection systems used for projecting an image on a screen can use white light configured to imagewise reflect from a digital micro-mirror (DMM) array, such as the array used in Texas Instruments' Digital Light Processor (DLP®) displays. In the DLP® display, individual mirrors within the digital micro-mirror array represent individual pixels of the projected image. A display pixel is illuminated when the corresponding mirror is tilted so that incident light is directed into the projected optical path. A rotating color wheel placed within the optical path is timed to the reflection of light from the digital micro-mirror array, so that the reflected white light is filtered to project the color corresponding to the pixel. The digital micro-mirror array is then switched to the next desired pixel color, and the process is continued at such a rapid rate that the entire projected display appears to be continuously illuminated. The digital micro-mirror projection system requires fewer pixelated array components, which can result in a smaller size projector.

Image brightness is an important parameter of a projection system. The brightness of color light sources and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources.

Liquid crystal displays often use only one polarization of light, and generally use light sources that generate unpolarized light. Several means for converting unpolarized light to polarized light, including polarizing beam splitters, and arrays of birefringent or polarizing prisms have been used to generate polarized light. These systems can require a substantial volume, especially considering light collection optics and integrating systems. Several types of displays, including handheld devices, micro-projection systems, and head-mounted displays require both compactness and high efficiency.

Pico and pocket projectors have limited available space for efficient color combiners, light integrators, and/or homogenizers. As a result, efficient and uniform light output from the optical devices used in these projectors (such as color combiners and polarization converters) can require compact and efficient optical designs.

SUMMARY

The disclosure generally relates to refractive polarization converters, polarized color combiners using the refractive polarization converters, and in particular polarized color combiners using the refractive polarization converters that can be useful in small size format projectors such as pocket projectors. The disclosed refractive polarization converters include at least one birefringent prism that can separate an unpolarized light beam into divergent polarized light beams having orthogonal polarization directions.

In one aspect, the present disclosure provides a polarization converter that includes a first light collection optics having a light input surface and an optical axis; an unpolarized light source capable of injecting an unpolarized light beam into the light input surface along a first propagation direction parallel to the optical axis; and an optical device comprising a birefringent prism, the optical device disposed facing the first light collection optics and opposite the light input surface. The polarization converter further includes a reflector disposed to reflect the first and second polarized light beams back through the optical device and the first light collection optics, toward the light input surface. The optical device is capable of splitting the unpolarized light beam into a first polarized light beam and a second polarized light beam having orthogonal polarization states, at least one of the first and second polarized light beams diverging from the first propagation direction. The first polarized light beam passes through the light input surface at a first position displaced from the unpolarized light source, and the second polarized light beam passes through the light input surface at a second position displaced from the first position and the unpolarized light source. In another aspect, the polarization convert includes a half-wave retarder disposed adjacent the light input surface, and capable of converting a first polarization state of the first polarized light beam to a second polarization state such that a combined polarized output light is polarized in the second polarization state. In yet another aspect, the polarization converter still further includes an optical integrator disposed to accept the first and the second polarized light beams.

In another aspect, the present disclosure provides a polarization converting color combiner that includes a polarization converter. The polarization converter includes a first light collection optics having a light input surface and an optical axis; an unpolarized light source capable of injecting an unpolarized light beam into the light input surface along a first propagation direction parallel to the optical axis; and an optical device comprising a birefringent prism, the optical device disposed facing the first light collection optics and opposite the light input surface. The polarization converter further includes a reflector disposed to reflect the first and second polarized light beams back through the optical device and the first light collection optics, toward the light input surface. The optical device is capable of splitting the unpolarized light beam into a first polarized light beam and a second polarized light beam having orthogonal polarization states, at least one of the first and second polarized light beams diverging from the first propagation direction. The first polarized light beam passes through the light input surface at a first position displaced from the unpolarized light source, and the second polarized light beam passes through the light input surface at a second position displaced from the first position and the unpolarized light source. The unpolarized light source comprises a first color light source capable of emitting a first color light and a second color light source capable of emitting a second color light, each displaced from the optical axis, and the reflector comprises a dichroic plate. In another aspect, the polarization convert includes a half-wave retarder disposed adjacent the light input surface, and capable of converting a first polarization state of the first polarized light beam to a second polarization state such that a combined polarized output light is polarized in the second polarization state. In yet another aspect, the polarization converter still further includes an optical integrator disposed to accept the first and the second polarized light beams.

In yet another aspect, the present disclosure provides a polarization converting color combiner that includes a polarization converter. The polarization converter includes a first light collection optics having a light input surface and an optical axis; an unpolarized light source capable of injecting an unpolarized light beam into the light input surface along a first propagation direction parallel to the optical axis; and an optical device comprising a birefringent prism, the optical device disposed facing the first light collection optics and opposite the light input surface. The polarization converter further includes a reflector disposed to reflect the first and second polarized light beams back through the optical device and the first light collection optics, toward the light input surface. The optical device is capable of splitting the unpolarized light beam into a first polarized light beam and a second polarized light beam having orthogonal polarization states, at least one of the first and second polarized light beams diverging from the first propagation direction. The first polarized light beam passes through the light input surface at a first position displaced from the unpolarized light source, and the second polarized light beam passes through the light input surface at a second position displaced from the first position and the unpolarized light source. The unpolarized light source comprises a first color light source capable of emitting a first color light and a second color light source capable of emitting a second color light, each displaced from the optical axis, and the reflector comprises a dichroic plate. The polarization converter further includes a third color light source displaced from the optical axis and disposed to inject a third color light into the light input surface, wherein the dichroic plate further comprises a third reflector capable of reflecting the third color light to exit through the light input surface along the optical axis. In another aspect, the polarization convert includes a half-wave retarder disposed adjacent the light input surface, and capable of converting a first polarization state of the first polarized light beam to a second polarization state such that a combined polarized output light is polarized in the second polarization state. In yet another aspect, the polarization converter still further includes an optical integrator disposed to accept the first and the second polarized light beams.

In yet another aspect, the present disclosure provides an image projector that includes a polarization converter; a spatial light modulator disposed to impart an image to the combined polarized output light; and projection optics. The polarization converter includes a first light collection optics having a light input surface and an optical axis; an unpolarized light source capable of injecting an unpolarized light beam into the light input surface along a first propagation direction parallel to the optical axis; and an optical device comprising a birefringent prism, the optical device disposed facing the first light collection optics and opposite the light input surface. The polarization converter further includes a reflector disposed to reflect the first and second polarized light beams back through the optical device and the first light collection optics, toward the light input surface. The optical device is capable of splitting the unpolarized light beam into a first polarized light beam and a second polarized light beam having orthogonal polarization states, at least one of the first and second polarized light beams diverging from the first propagation direction. The first polarized light beam passes through the light input surface at a first position displaced from the unpolarized light source, and the second polarized light beam passes through the light input surface at a second position displaced from the first position and the unpolarized light source. In another aspect, the polarization convert includes a half-wave retarder disposed adjacent the light input surface, and capable of converting a first polarization state of the first polarized light beam to a second polarization state such that a combined polarized output light is polarized in the second polarization state. In yet another aspect, the polarization converter still further includes an optical integrator disposed to accept the first and the second polarized light beams.

In yet another aspect, the present disclosure provides an image projector that includes a polarization converting color combiner; a spatial light modulator disposed to impart an image to the polarized first, second, and third color light; and projection optics. The polarization converting color combiner includes a polarization converter. The polarization converter includes a first light collection optics having a light input surface and an optical axis; an unpolarized light source capable of injecting an unpolarized light beam into the light input surface along a first propagation direction parallel to the optical axis; and an optical device comprising a birefringent prism, the optical device disposed facing the first light collection optics and opposite the light input surface. The polarization converter further includes a reflector disposed to reflect the first and second polarized light beams back through the optical device and the first light collection optics, toward the light input surface. The optical device is capable of splitting the unpolarized light beam into a first polarized light beam and a second polarized light beam having orthogonal polarization states, at least one of the first and second polarized light beams diverging from the first propagation direction. The first polarized light beam passes through the light input surface at a first position displaced from the unpolarized light source, and the second polarized light beam passes through the light input surface at a second position displaced from the first position and the unpolarized light source. The unpolarized light source comprises a first color light source capable of emitting a first color light and a second color light source capable of emitting a second color light, each displaced from the optical axis, and the reflector comprises a dichroic plate. The polarization converter further includes a third color light source displaced from the optical axis and disposed to inject a third color light into the light input surface, wherein the dichroic plate further comprises a third reflector capable of reflecting the third color light to exit through the light input surface along the optical axis. In another aspect, the polarization convert includes a half-wave retarder disposed adjacent the light input surface, and capable of converting a first polarization state of the first polarized light beam to a second polarization state such that a combined polarized output light is polarized in the second polarization state. In yet another aspect, the polarization converter still further includes an optical integrator disposed to accept the first and the second polarized light beams.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
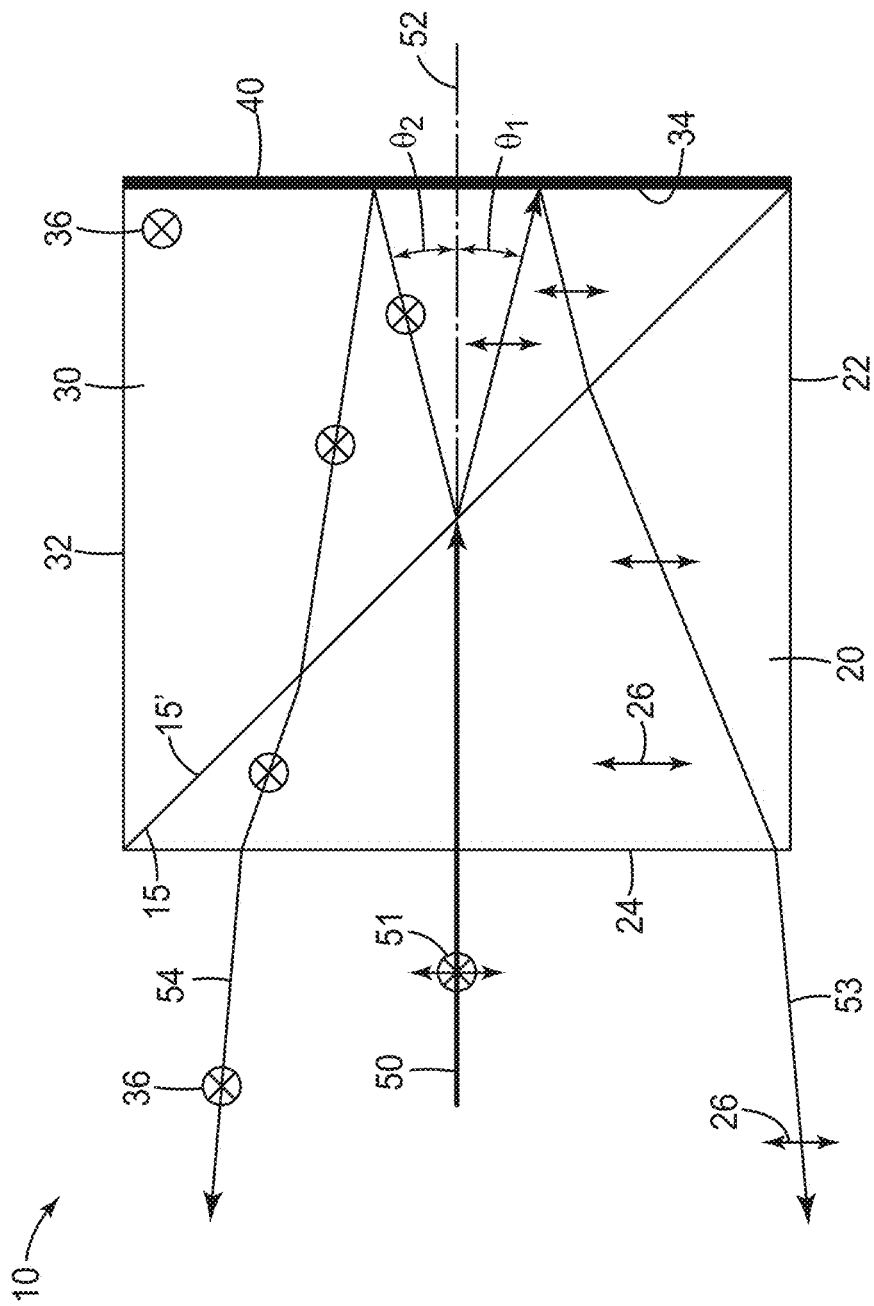
FIG. 1 shows a cross-section schematic of an optical device.

The disclosure generally relates to refractive polarization converters, polarized color combiners using the refractive polarization converters, and in particular polarized color combiners using the refractive polarization converters that can be useful in small size format projectors such as pocket projectors. The disclosed refractive polarization converters include at least one birefringent prism that can separate an unpolarized light beam into divergent polarized light beams having orthogonal polarization directions.

Many display devices use polarized light, including LCD backlights, projectors, and head mounted displays. In one particular embodiment, the present disclosure provides a compact polarization converter that provides an efficient and high brightness source in a compact format. In some cases, an unpolarized light source, collection optics, a birefringent prism, a second collection optics, and a one-half wave retarder can be used to produce a light beam having one state of polarization. Furthermore, the polarized beam may be easily coupled to a light integrator to improve the optical homogeneity of the light source.

Examples of useful birefringent prisms include Wollaston prisms, Senarmont prisms, Nicol prisms, Rochon prisms, Nomarski prisms, and the like. A single birefringent prism may be used, as well as combinations of the prisms. The birefringent prism, such as a Wollaston prism, may be made by conventional means using calcite or another birefringent mineral, or may be made from birefringent polymers or liquid crystals. In one particular embodiment, a suitable design is to make the prisms from uniaxially oriented polyethylene terephthalate (PET), polyethylene naphthalate (PEN), or another birefringent polymer. Combinations of two or more birefringent materials may be use to reduce the dispersion of the prisms. In some cases, the individual birefringent prisms may each be made from a single sheet of birefringent material, or they may be made from a bonded stack of layers or films of birefringent material. The bonding layer, if used, is preferably very thin, typically one fifth or less of the thickness of the birefringent layers.

The described polarization converter may be combined with a color combiner, such as a tilted dichroic plate color combiner, described, for example, in co-pending U.S. Patent Application No. 61/385,237 entitled "Tilted Dichroic Color Combiner I"; U.S. Application No. 61/385,241 entitled "Tilted Dichroic Color Combiner II"; or U.S. Application No. 61/385,248 entitled "Tilted Dichroic Color Combiner III", all filed on Sep. 22, 2010.

Image projectors can often include a device for optically homogenizing a beam of light in order to improve brightness and color uniformity for light projected on a screen. Two common devices are an integrating tunnel or rod, and a fly's eye array (FEA) homogenizer. Fly's eye homogenizers can be very compact, and for this reason is a commonly used device. Integrating tunnels can be more efficient at homogenization, but a hollow tunnel generally requires a length that is often 5 times the height or width, whichever is greater. Solid tunnels often are longer than hollow tunnels, due to the effects of refraction. Light integrating tunnels or rods have any desired cross-section including, for example, a rectangle, a square, a polygon, a circle, an ellipse, and the like. Typically, either an integrating tunnel or rod, or an FEA could be used for homogenization, but both techniques generally would not be used together. Integrating rods can have a lower impact on etendue, but can cause depolarization. FEAs can preserve polarization well (if they are made from low birefringence materials), but can increase etendue.

In one particular embodiment, a color combiner is described that includes at least two light emitting diodes (LEDs), each with a different color. The light emitted from the two LEDs is collimated into beams that substantially overlap, and the light from the two LEDs is combined and directed into a common area with the combined light beams having a lower etendue and higher brightness than the light emitted by the two LEDs.

The LEDs may be used to illuminate projectors. Since LEDs emit light over an area with a near Lambertian angular distribution, the brightness of a projector is limited by the etendue of the source and the projection system. One method for reducing the etendue of the LED light source is to use dichroic reflectors to make two or more colors of LEDs spatially overlap, such that they appear to be emitting from the same region. Ordinarily, color combiners use the dichroic reflectors at an angle of about 45 degrees. This causes a strong reflective band shift, and limits the useful spectra and angular range of the dichroic reflector. In one particular embodiment, the present disclosure describes an article that combines different color LEDs using dichroic reflectors that are at near normal angles to the incident light beam.

In one aspect, the disclosure provides a compact method of efficiently combining the output from different color unpolarized light sources, into a combined color having a single polarization state. This can be particularly useful for producing illuminators for compact projection systems that are etendue limited. For example, a linear array of red, green, and blue LEDs, where the output of each LEDs is partially collimated by a set of primary optics, passes through a refractive polarization converter that separates the unpolarized light into divergent orthogonal polarized components, and is then incident on a tilted reflector plate assembly that contains dichroic reflector plates that reflect the red, green, and blue light at different angles. The reflected polarized light is then focused by the primary optics to an aperture that forms a common output for the red, green, and blue LEDs of each polarization state. The common output may be coupled to another set of collection optics that collimates the light and rotates one of the polarization states such that uniformly polarized light is light emitted by the color combiner. The light emitted by the common output may also be coupled to an integrating rod as described elsewhere. The exit aperture may be centered on the principal axis (for example, the optical axis) of the collection optics, or may be offset from the principal axis. The exit aperture may be in line with the LEDs, or adjacent to the LEDs, or a combination thereof. In some cases, the exit aperture and the LEDs can be disposed on a common substrate such as a flexible substrate, as described in, for example, U.S. Patent Application 61/428,038 entitled "LED Color Combiner", filed on an even date herewith.

The configuration of the 3 LEDs can be expanded to other colors, including yellow and infrared light, as understood by one of skill in the art. The light sources may include lasers combined with LEDs, and may be also be based on an all laser system. The LEDs may consist of a set emitting at least primary colors on short wavelength range of red, green, and blue, and a second set emitting the primary colors on the long wavelength range of red, green, and blue. Further, the aperture at which point the light is mixed may incorporate a Fly Eye Array (FEA) to provide further color integration. This may consist of a one or two dimensional array of lenses, with at least one dimension having 2 to about 20 lenses, as described elsewhere.

LCoS-based portable projection systems are becoming common due to the availability of low cost and high resolution LCoS panels. A list of elements in an LED-illuminated LCoS projector may include LED light source or sources, optional color combiner, optional pre-polarizing system, relay optics, PBS, LCoS panel, and projection lens unit. For LCoS-based projection systems, the efficiency and contrast of the projector is directly linked to the degree of polarization of light entering the PBS. One challenge with polarization-converted light is that it may suffer from spatial nonuniformity, leading to artifacts in the displayed image. Therefore, in systems with polarization converters, a homogenization system can be desirable, as described elsewhere.

In one particular embodiment, the polarized beams of light can pass through to a monolithic FEA integrator. The monolithic FEA integrator can cause the light beams to diverge, and the light beams are then directed for further processing, for example, by using a spatial light modulator to impart an image to the light beams, and projection optics to display the image on a screen.

FIG. 1 shows a cross-section schematic of an optical device 10 that can be used to split an unpolarized light beam into separate orthogonal polarization states, according to one aspect of the disclosure. Optical device 10 can include known polarization splitters such as a Wollaston prism, a Senarmont prism, a Nicol prism, a Rochon prism, a Nomarski prism, a Glan-Thompson prism, a Glan-Foucault prism, or a combination thereof. In each case, an incoming unpolarized light beam is split such that at least one of the polarization states deviates from the propagation direction of the incoming unpolarized light beam, as described elsewhere.

In one particular embodiment, optical device 10 can be compared to a Wollaston prism that includes a first birefringent prism 20 having a first prism surface 22, a second prism surface 24 and a diagonal first prism surface 15 between them. Optical device 10 further includes a second birefringent prism 30 having a third surface 32, a fourth surface 34, and a diagonal second prism surface 15' between them. The fast axis of the first birefringent prism 20 is aligned with a first polarization direction 26, and the fast axis of the second birefringent prism 30 is aligned with a second polarization direction 36. Each of the first and second birefringent prisms 20, 30, can be fabricated from, for example, calcite crystals or other birefringent materials, as known to one of skill in the art.

The first and second birefringent prisms 20, 30 are positioned such that the first and second polarization directions 26, 36, respectively, are aligned orthogonal to each other, and the first and second birefringent prisms 20, 30, are positioned such that the diagonal first and second prism surfaces 15, 15' are immediately adjacent each other. In some cases, the diagonal first and second prism surfaces 15, 15' can be adhered to each other using an optical adhesive. In one particular embodiment, the fourth prism surface 34 can include a reflector 40 that is disposed to reflect light beams back through the first and second birefringent prisms 20, 30. The reflector 40 can be any known reflector, such as a broadband mirror. The reflector can be, for example, a metal or a metal alloy mirror, or a dichroic reflector including interference reflectors such as a multilayer dielectric reflector including either inorganic or organic multilayer film stacks, or a combination of inorganic and organic multilayer film stacks. The reflector 40 can be disposed immediately adjacent the fourth prism surface 34 as shown in FIG. 1, or it can be positioned separated from the fourth prism surface 34, as described elsewhere.

An unpolarized input light beam 50 travelling along a propagation direction 52 includes random polarization states 51. The unpolarized input light beam 50 passes through second prism surface 24 of first birefringent prism 20, and diagonal first and second prism faces 15, 15' as it enters second birefringent prism 30. Each of the orthogonal polarization components of unpolarized input light beam 50 (first polarization direction 26 and second polarization direction 36) are refracted differently at the diagonal first and second prism faces 15, 15'. The unpolarized input light beam 50 diverges into a first polarized light beam 53 having the first polarization direction 26 propagating at a first refraction angle $\theta 1$ to propagation direction 52, and a second polarized light beam 54 having the second polarization direction 36 propagating at a second refraction angle $\theta 2$ to propagation direction 52. First and second polarized light beams 53, 54 reflect from reflector 40, refract again through diagonal first and second prism faces 15, 15', and exit first prism face 24 as first and second polarized light beams 53, 54 that are progressing at angles and positions that are different and separated from the unpolarized input light beam 50, that is, each of the polarization directions are separated and diverge.

In some cases, the first refraction angle $\theta 1$ and the second refraction angle $\theta 2$ are essentially the same (for example, in a Wollaston prism with the diagonal first prism face 15 at an angle of 45 degrees to each of the first and second prism surfaces 22, 24), as shown in FIG. 1. In some cases, the angles can be different, for example in a Wollaston prism with the diagonal first prism face 15 at an angle different from 45 degrees (not shown), or by using one of the alternative birefringent prisms described above, as known to one of skill in the art. Generally, the optical device 10 can be designed to accommodate any desired separation and divergence of the polarized beams.

Figure 2A:
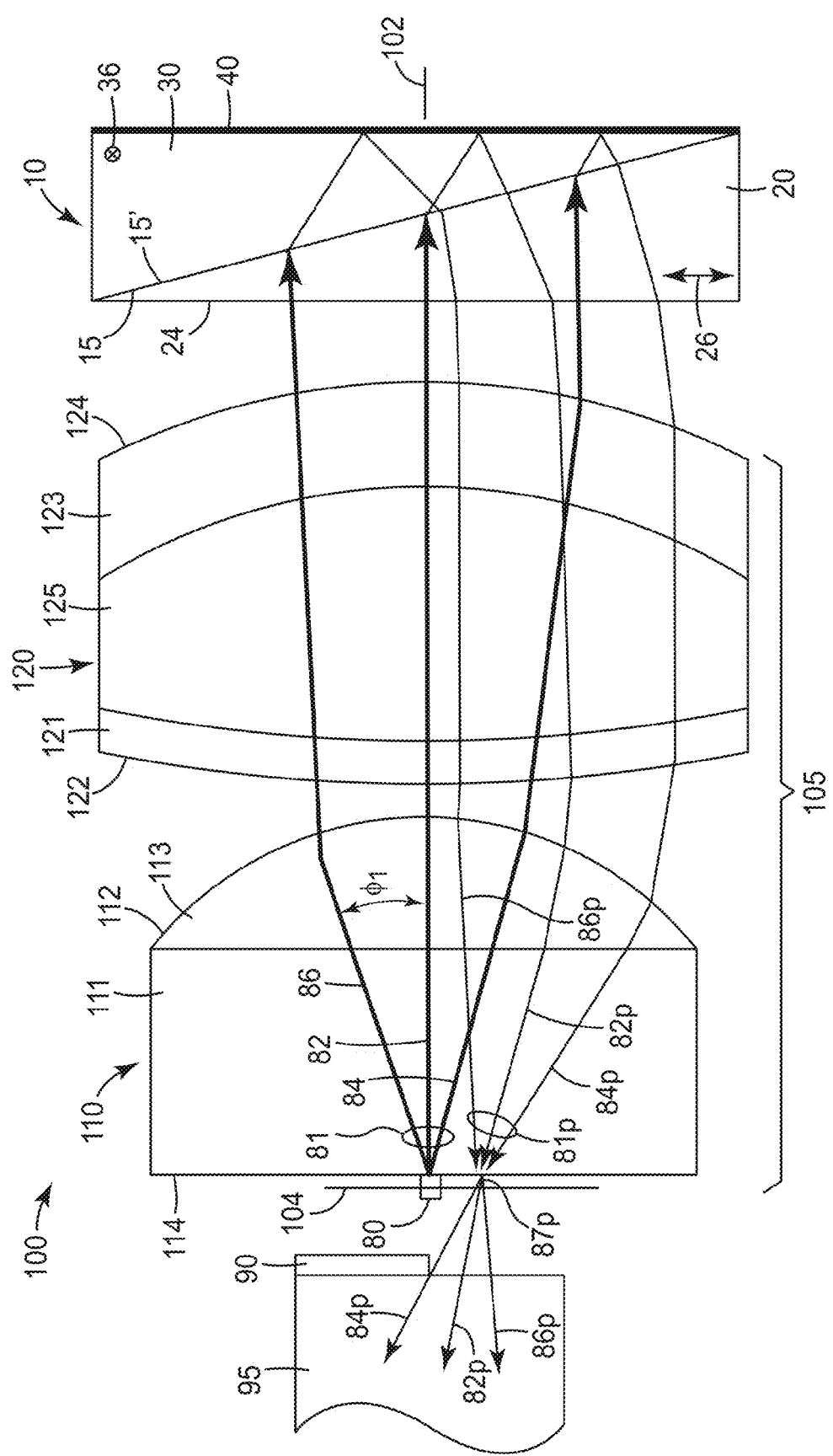
FIGS. 2A-2B shows a cross-section schematic of a polarization converter.
Figure 2B:
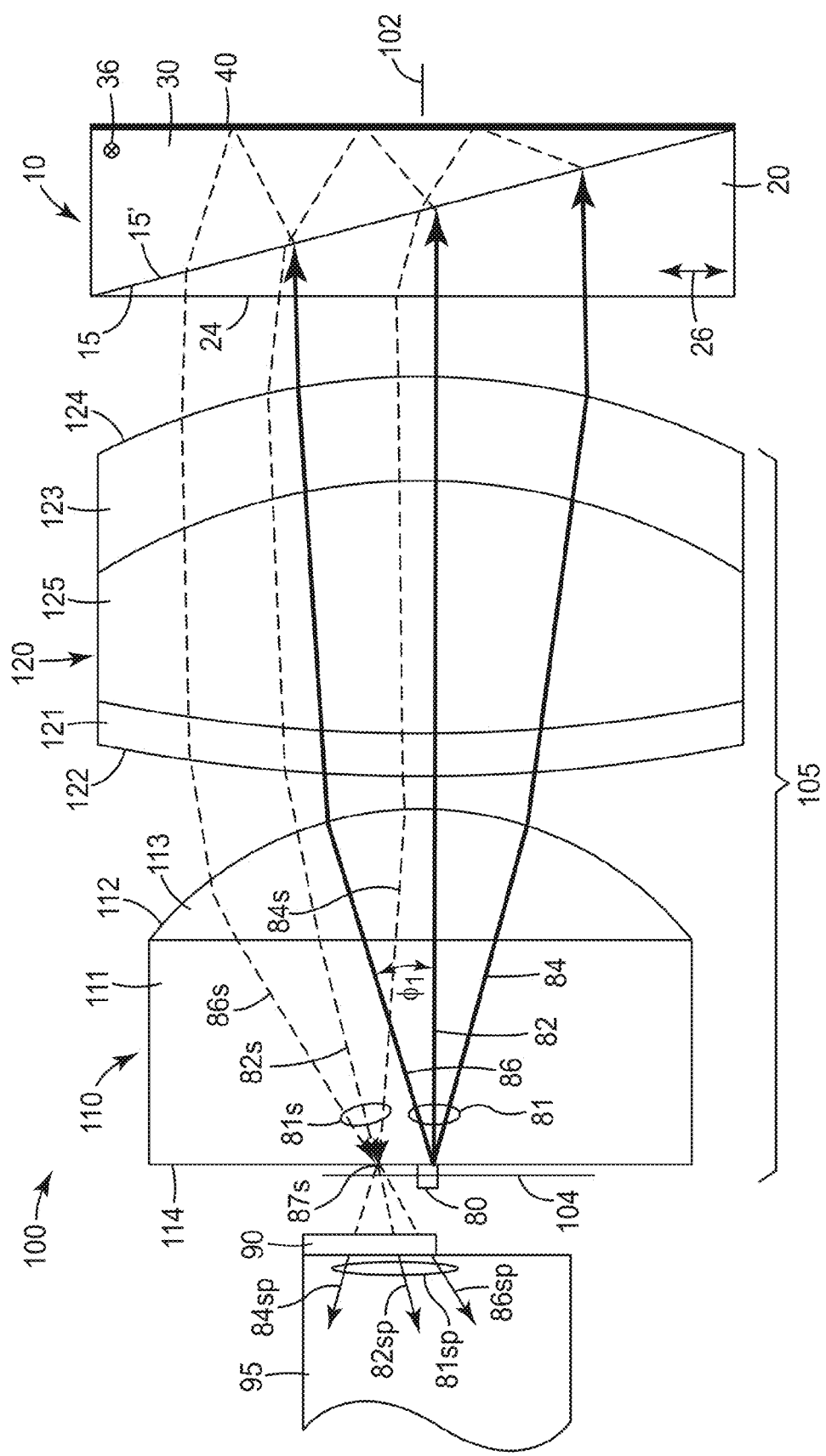

FIGS. 2A-2B shows a cross-section schematic of a polarization converter 100 according to one aspect of the disclosure. Each of the elements 15-40 shown in FIGS. 2A-2B correspond to like-numbered elements 15-40 shown in FIG. 1, which have been described previously. In FIGS. 2A-2B, the polarization converter 100 includes a first light collection optics 105 including a first lens element 110 and a second lens element 120. The first light collection optics 105 includes a light input surface 114 and an optical axis 102 perpendicular to the light input surface 114. An unpolarized light source 80 is disposed on a light injection surface 104 that faces the light input surface 114. The unpolarized light source 80 is shown in FIG. 2A-2B to be disposed on the optical axis 102; however it can be positioned separated from the optical axis 102, as desired, along the light injection surface 104. The unpolarized light source 80 is disposed to inject an unpolarized light 81 of a desired color or wavelength, into the light input surface 114, as described elsewhere.

In one particular embodiment, polarization converter 100 further includes an optical device 10 disposed facing the first light collection optics 105 along the optical axis 102, such that the first lens element 110 and the second lens elements 120 are between the optical device 10 and the light input surface 114. The optical device 10 includes the components already described with reference for FIG. 1, elsewhere.

In one particular embodiment, first light collection optics 105 can be a light collimator that serves to collimate the light emitted from the unpolarized light source 80. First light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface.

Turning to FIG. 2A, the path of a first polarization component of light 81p of the unpolarized light 81 from unpolarized light source 80 can be traced through polarization converter 100. In some cases, the first polarization direction can be designated as "p–" polarization, and the second polarization direction can be designated as "s–" polarization, as known in the art. Unpolarized light source 80 includes a first central light ray 82 travelling in the light propagation direction along the optical axis 102, and a cone of unpolarized light 81 within unpolarized input light collimation angle φ1, the boundaries of which are represented by first boundary light rays 84, 86. The first central light ray 82 is injected from unpolarized light source 80 into light input surface 114 in a direction generally parallel to the optical axis 102, passes through first lens element 110, second lens element 120, and enters optical device 10 through second prism face 24. As can be seen from FIG. 2A, the first light collection optics 105 serve to collimate the unpolarized light 81 passing from the unpolarized light source 80 to the optical device 10.

The first central light ray 82 passes through first birefringent prism 20 and is refracted as it passes through diagonal first and second prism faces 15, 15' into second birefringent prism 30. The first polarization component of central light ray 82p, being orthogonal to the second polarization direction 36 (that is, the fast-axis) causes the light to deviate from the unpolarized light propagation direction (along optical axis 102) as described elsewhere. The first polarization component of central light ray 82p then reflects from reflector 40.

Each of the first boundary light rays 84, 86 are injected into the light input surface 114 in a direction generally at the unpolarized input light collimation angle φ1 to the optical axis 102, pass through first lens element 110, second lens element 120, and enter optical device 10 through second prism face 24. The first boundary light rays 84, 86 pass through first birefringent prism 20 and are refracted as they pass through diagonal first and second prism faces 15, 15' into second birefringent prism 30. The first polarization component of boundary light rays 84p, 86p, being orthogonal to the second polarization direction 36 (that is, the fast-axis) causes the light to deviate from the unpolarized light propagation direction (along optical axis 102) as described elsewhere. The first polarization component of boundary light rays 84p, 86p, then reflect from reflector 40, such that the reflected beams are generally parallel to the optical axis 102 as shown.

Each of the first polarization component of central and boundary light rays 82p, 84p, 86p, reflect from the reflector 40 and travel back through the first light collection optics 105 as collimated light rays parallel to the optical axis 102. The first polarization component of central and boundary light rays 82p, 84p, 86p, collectively form a first polarization direction output light beam 81p that can converge on a first polarization light ray focal point 87p. The first polarization direction output light beam 81p can then be made more uniform by being directed into a light integrating rod 95, as known to one of skill in the art.

Turning to FIG. 2B, the path of a second polarization component of light 81s of the unpolarized light 81 from unpolarized light source 80 can be traced through polarization converter 100. The path of the central, first boundary, and second boundary light rays 82, 84, 86, from the unpolarized light source 80 has already been traced through to the diagonal first and second prism faces 15, 15'. The second polarization component of central light ray 82s, being parallel to the second polarization direction 36 (that is, the fast-axis) causes the light to deviate from the unpolarized light propagation direction (along optical axis 102) as described elsewhere. The second polarization component of central light ray 82s then reflects from reflector 40.

The second polarization component of boundary light rays 84s, 86s, being parallel to the second polarization direction 36 (that is, the fast-axis) causes the light to deviate from the unpolarized light propagation direction (along optical axis 102) as described elsewhere. The second polarization component of boundary light rays 84s, 86s, then reflect from reflector 40, such that the reflected beams are generally parallel to the optical axis 102 as shown.

Each of the second polarization component of central and boundary light rays 82s, 84s, 86s, reflect from the reflector 40 and travel back through the first light collection optics 105 as collimated light rays parallel to the optical axis 102. The second polarization component of central and boundary light rays 82s, 84s, 86s, collectively form a second polarization direction output light beam 81s that can converge on a second polarization light ray focal point 87s. The second polarization direction output light beam 81s can then pass through a half-wave retarder 90, such that the second polarization direction output light beam 81s rotates to the first polarization direction (that is, the same as first polarization direction output light beam 81p), and becomes rotated second polarization direction output light beam 81sp that includes rotated central and boundary light rays 82sp, 84sp, 86sp. The rotated second polarization direction output light beam 81sp can then be made more uniform by being directed into a light integrating rod 95, as known to one of skill in the art.

In one particular embodiment, the half-wave retarder 90 can cover one half of the integrating rod 95, such that it converts the polarized light to the same polarization state as collected by the other half of the integrating rod. The half-wave retarder 90 may be made from quartz or other materials commonly used for retarder plates. In some cases, the half-wave retarder 90 is achromatic or apochromatic, and can include a wide acceptance angle range. A suitable wide angle retarder, for example, can be made from quartz and sapphire. In some cases, the sidewalls of the half-wave retarder 90 may be metalized to reflect light that is incident on the sidewalls of the retarder. The sidewalls may also be polished to specularly reflect incident light.

As shown by FIGS. 2A-2B, unpolarized light 81 becomes a first polarization direction polarized output light beam that includes first polarization direction output light beam 81p and rotated second polarization direction output light beam 81sp. In one particular embodiment, the half-wave retarder 90 can be disposed such that the second polarization light ray focal point 87s is positioned at the half-wave retarder 90, and an improvement in efficiency of the polarization converter 100 can result. The second polarization light ray focal point 87s may be adjusted such that the focal point is at the half-wave retarder 90, or the half-wave retarder may be positioned closer to the light input surface 114 to intercept the second polarization light ray focal point 87s.

Figure 3A:
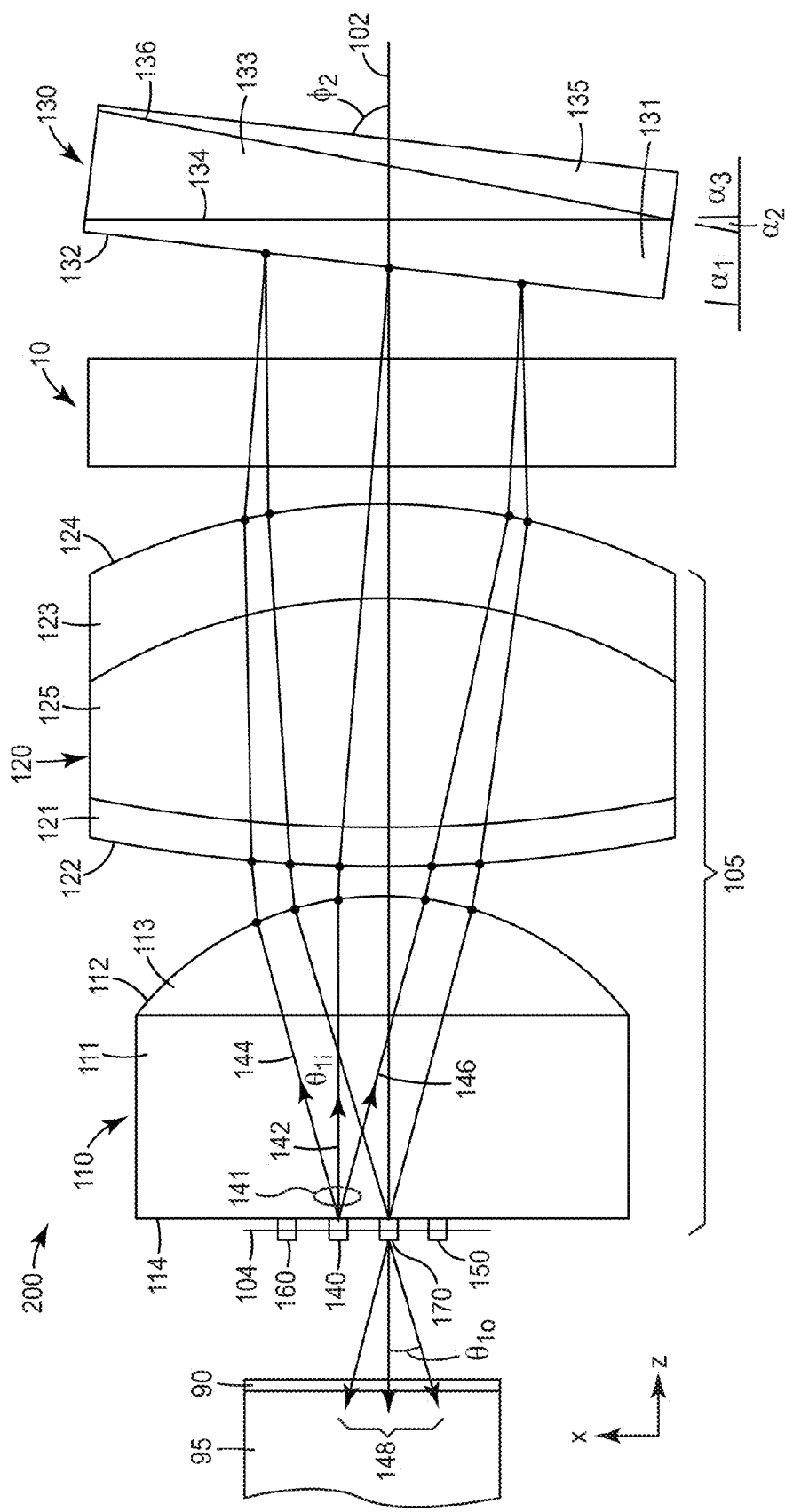
FIGS. 3A-3C shows a cross-section schematic of a color combiner.
Figure 3B:
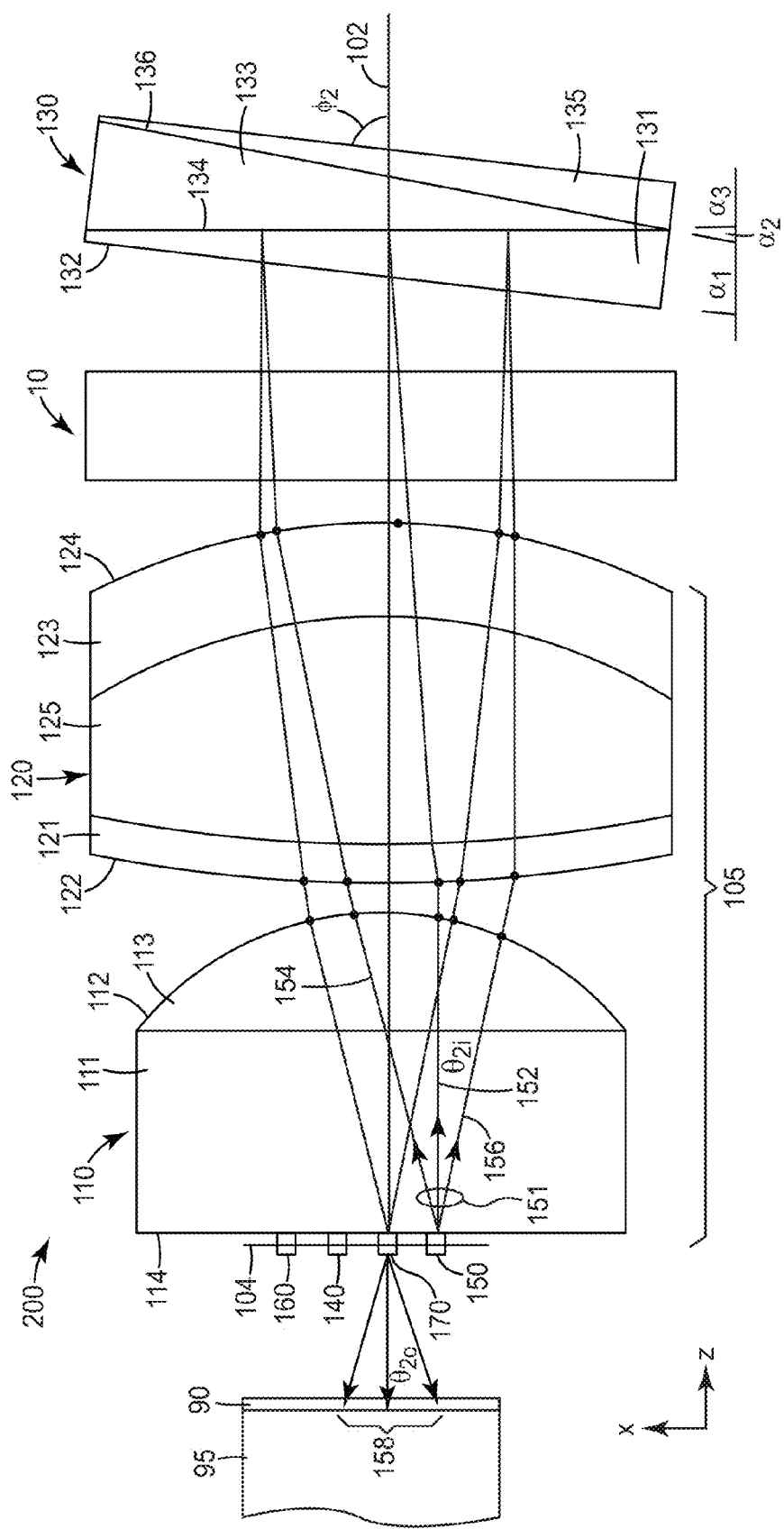
Figure 3C:
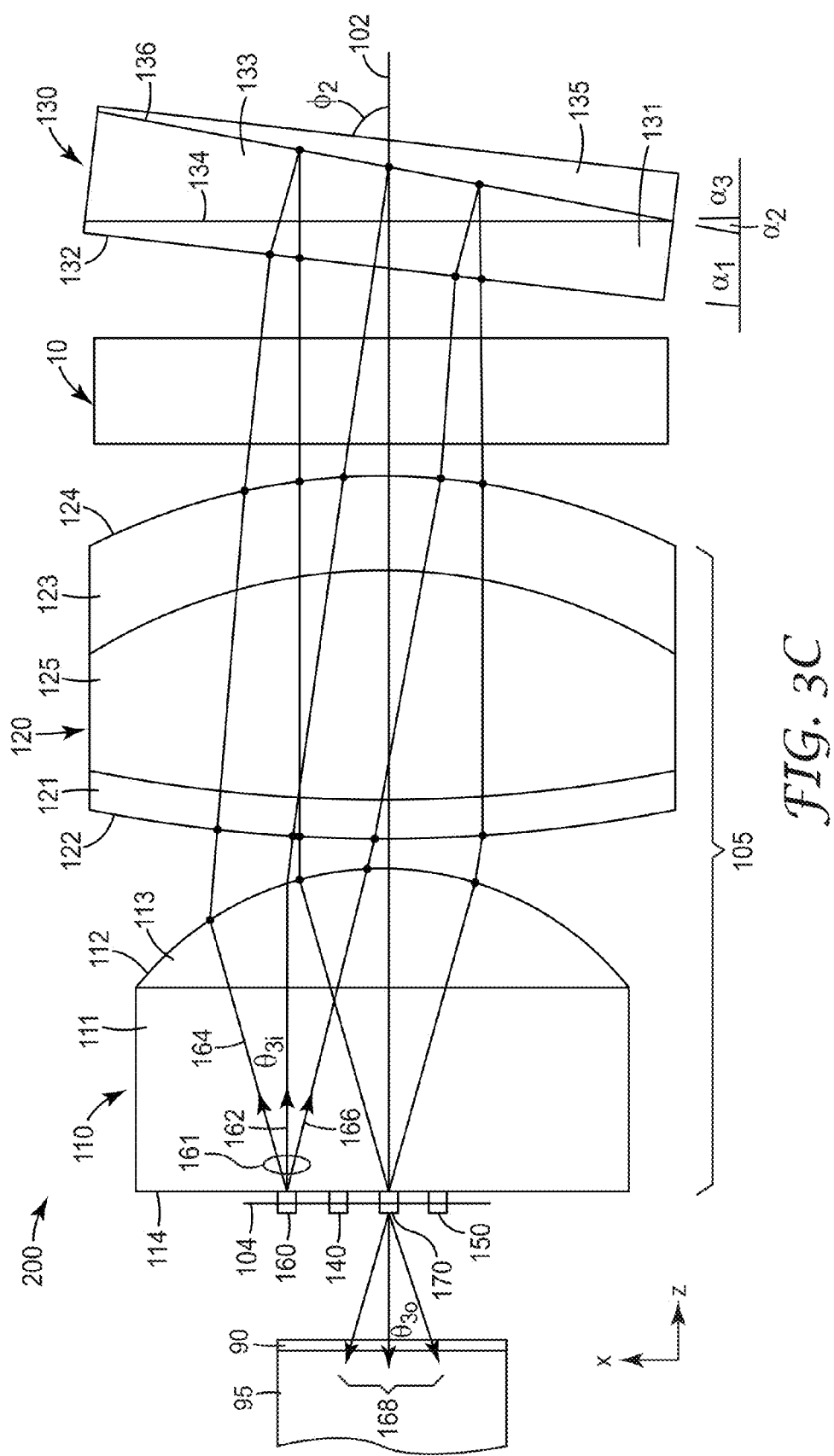

FIGS. 3A-3C shows a cross-section schematic of a polarized color combiner 200 viewed perpendicular to the X-Z plane of a Cartesian coordinate system, according to one aspect of the disclosure. The polarized color combiner 200 includes a collection of color combination components described elsewhere, for example, in co-pending U.S. Patent Application Ser. No. 61/385,237 entitled "Tilted Dichroic Color Combiner I". It is to be understood that an optical device 10 described herein, that can split unpolarized light into the polarized components, can be adapted to any suitable color combiner, such as those described in co-pending U.S. Patent Application Ser. No. 61/385,241 entitled "Tilted Dichroic Color Combiner II"; and U.S. Application No. 61/385,248 entitled "Tilted Dichroic Color Combiner III", and the like.

In the X-Z plane view of the polarized color combiner 200, the polarization splitting is not visible, since this splitting occurs in the Y-Z plane. In the Y-Z plane views provided in FIGS. 4A-4B, the polarization splitting is visible, and the color combination is not visible. It is to be understood that the separation of the polarized color combiner into separately viewed optical paths through FIGS. 3A-3C and FIGS. 4A-4B is for clarity of illustration purposes only, and the separation of colored light beams into orthogonal polarizations and the combination of colored light beams into a combined color beam occur simultaneously.

In FIGS. 3A-3C, the polarized color combiner 200 includes a first light collection optics 105 including a first lens element 110 and a second lens element 120. The first light collection optics 105 includes a light input surface 114 and an optical axis 102 perpendicular to the light input surface 114. A first unpolarized light source 140, a second unpolarized light source 150, and an optional third unpolarized light source 160 are each disposed on a light injection surface 104 that faces the light input surface 114. A light output region 170 is located on the optical axis 102 and disposed on the light injection surface 104. Each of the first, the second, and the optional third unpolarized light sources 140, 150, 160, are displaced from the optical axis 102. Each of the first, the second, and the optional third unpolarized light sources 140, 150, 160, are disposed to inject a first color light 141, a second color light 151, and an optional third color light 161, respectively, into the light input surface 114, as described elsewhere.

In one particular embodiment, polarized color combiner 200 further includes a dichroic plate 130 disposed facing the first light collection optics 105 along the optical axis 102, such that the first lens element 110 and the second lens elements 120 are between the dichroic plate 130 and the light input surface 114. The dichroic plate 130 can be disposed at a tilt angle $\phi 2$ to the optical axis, and includes a first dichroic reflector 132 capable of reflecting the first color light 141 and transmitting all other colors of light. The dichroic plate 130 further includes a second dichroic reflector 134 capable of reflecting the second color light 151 and transmitting all other colors of light. The dichroic plate 130 still further includes an optional third dichroic reflector 136 that is capable of reflecting the optional third color light 161. In some cases, for example when only a first and a second unpolarized light source 140, 150 are included (that is, optional third unpolarized light source 160 is omitted), second dichroic reflector can be instead a generic reflector such as a broadband mirror, since there is no need to transmit other wavelengths (that is, colors) of light. In some cases, for example when optional third unpolarized light source 160 is included, optional third dichroic reflector 136 can also be a reflector such as a broadband mirror, since all other colors of light are already reflected by the other dichroic reflectors, prior to reaching the third dichroic reflector 136.

The dichroic plate 130 is fabricated such that each of the first, second, and optional third dichroic reflectors 132, 134, 136, are tilted at a first dichroic tilt angle $\alpha 1$, a second dichroic tilt angle $\alpha 2$, and a third dichroic tilt angle $\alpha 3$, respectively, to the optical axis 102. In some cases, as shown for example in FIGS. 3A-3C, the first dichroic tilt angle $\alpha 1$ can be the same as dichroic plate tilt angle $\phi 2$, although it can also be different. Each of the first, second, and third dichroic tilt angles $\alpha 1$, $\alpha 2$, $\alpha 3$, can be selected to direct the reflected beams from each of the first, second, and optional third unpolarized light sources 140, 150, 160, through the light output region 170, as described elsewhere.

In one particular embodiment, polarized color combiner 200 further includes an optical device 10, described elsewhere, which is disposed between the first light collection optics 105 and the dichroic plate 130. Optical device 10 is capable of splitting an unpolarized light beam into divergent polarized components, as described elsewhere. In one particular embodiment shown in FIGS. 3A-3C and FIGS. 4A-4B, the reflector 40 described with reference to FIG. 1 and FIGS. 2A-2B is replaced by dichroic plate 130, that includes the first, second, and optional third dichroic reflectors 132, 134, 136, described herein. As shown in FIGS. 3A-3C and FIGS. 4A-4B, the dichroic plate 130 can be disposed separated from optical device 10, and need not be disposed immediately adjacent to the birefringent prisms as shown in FIG. 1 and FIGS. 2A-2B.

In one particular embodiment, first light collection optics 105 can be a light collimator that serves to collimate the light emitted from the first, second, and optional third unpolarized light sources 140, 150, 160. First light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface.

Turning to FIG. 3A, the path of the first color light 141 from first unpolarized light source 140 can be traced through polarized color combiner 200. First color light 141 includes a first color central light ray 142 travelling in the first light propagation direction, and a cone of rays within first input light collimation angle $\theta 1i$, the boundaries of which are represented by first color boundary light rays 144, 146. The first color central light ray 142 is injected from first unpolarized light source 140 into light input surface 114 in a direction generally parallel to the optical axis 102, passes through first lens element 110, second lens element 120, optical device 10, and reflects from first dichroic reflector 132 such that the reflected beam is coincident with the optical axis 102 as shown. Each of the first color boundary light rays 144, 146 are injected into the light input surface 114 in a direction generally at the first input light collimation angle $\theta 1i$ to the optical axis 102, passes through first lens element 110, second lens element 120, optical device 10, and reflects from first dichroic reflector 132 such that the reflected beams are generally parallel to the optical axis 102 as shown. As can be seen from FIG. 1A, the first light collection optics 105 serve to collimate the first color light 141 passing from the first unpolarized light source 140 to the dichroic plate 130.

Each of the first color central light ray 142 and the first color boundary light rays 144, 146, reflect from the first dichroic reflector 132 and travel back through the first light collection optics 105 as collimated light rays parallel to, and centered upon, the optical axis 102. In one particular embodiment as shown in FIG. 3A, the collimated light rays converge to exit the polarized color combiner 200 through the light output region 170 as a first color light beam 148 having a first output collimation angle θ2o. The first color light beam 148 can then be made more uniform by being directed into a light integrating rod 95, as known to one of skill in the art. A half-wave retarder 90 covers a portion of the light integrating rod 95 to convert a polarization direction, as will be described with reference to FIGS. 4A-4B.

Turning to FIG. 3B, the path of the second color light 151 from second unpolarized light source 150 can be traced through polarized color combiner 200. Second color light 151 includes a second central light ray 152 travelling in the second light propagation direction, and a cone of rays within second input light collimation angle θ2i, the boundaries of which are represented by second boundary light rays 154, 156. The second central light ray 152 is injected from second unpolarized light source 150 into light input surface 114 in a direction generally parallel to the optical axis 102, passes through first lens element 110, second lens element 120, optical device 10, and reflects from second dichroic reflector 134 such that the reflected beam is coincident with the optical axis 102 as shown. Each of the second boundary light rays 154, 156 are injected into the light input surface 114 in a direction generally at the second input light collimation angle θ2i to the optical axis 102, passes through first lens element 110, second lens element 120, optical device 10, and reflects from second dichroic reflector 134 such that the reflected beams are generally parallel to the optical axis 102 as shown. As can be seen from FIG. 3B, the first light collection optics 105 serve to collimate the second color light 151 passing from the second unpolarized light source 150 to the dichroic plate 130.

Each of the second central light ray 152 and the second boundary light rays 154, 156, reflect from the second dichroic reflector 134 and travel back through the first light collection optics 105 as collimated light rays parallel to, and centered upon, the optical axis 102. In one particular embodiment as shown in FIG. 3B, the collimated light rays converge to exit the polarized color combiner 200 through the light output region 170 as a second color light beam 158 having a second output collimation angle θ2o. The second color light beam 158 can then be made more uniform by being directed into the light integrating rod 95, as known to one of skill in the art. The half-wave retarder 90 covers a portion of the light integrating rod 95 to convert a polarization direction, as will be described with reference to FIGS. 4A-4B.

Turning to FIG. 3C, the path of the optional third color light 161 from optional third unpolarized light source 160 can be traced through polarized color combiner 200. Optional third color light 161 includes a third central light ray 162 travelling in the third light propagation direction, and a cone of rays within third input light collimation angle θ3i, the boundaries of which are represented by third boundary light rays 164, 166. The third central light ray 162 is injected from optional third unpolarized light source 160 into light input surface 114 in a direction generally parallel to the optical axis 102, passes through first lens element 110, second lens element 120, optical device 10, and reflects from third dichroic reflector 136 such that the reflected beam is coincident with the optical axis 102 as shown. Each of the third boundary light rays 164, 166 are injected into the light input surface 114 in a direction generally at the third input light collimation angle θ3i to the optical axis 102, passes through first lens element 110, second lens element 120, optical device 10, and reflects from third dichroic reflector 136 such that the reflected beams are generally parallel to the optical axis 102 as shown. As can be seen from FIG. 3C, the first light collection optics 105 serve to collimate the optional third color light 161 passing from the optional third unpolarized light source 160 to the dichroic plate 130.

Each of the third central light ray 162 and the third boundary light rays 164, 166, reflect from the third dichroic reflector 136 and travel back through the first light collection optics 105 as collimated light rays parallel to, and centered upon, the optical axis 102. In one particular embodiment as shown in FIG. 3C, the collimated light rays converge to exit the polarized color combiner 200 through the light output region 170 as an optional third color light beam 168 having a third output collimation angle θ3o. The third color light beam 168 can then be made more uniform by being directed into the light integrating rod 95, as known to one of skill in the art. The half-wave retarder 90 covers a portion of the light integrating rod 95 to convert a polarization direction, as will be described with reference to FIGS. 4A-4B.

In one particular embodiment, each of the first, the second, and the third input collimation angles θ1i, θ2i, θ3i can be the same, and injection optics (not shown) associated with each of the first, the second, and the optional third unpolarized light sources 140, 150, 160, can restrict these input collimation angles to angles between about 10 degrees and about 80 degrees, or between about 10 degrees to about 70 degrees, or between about 10 degrees to about 60 degrees, or between about 10 degrees to about 50 degrees, or between about 10 degrees to about 40 degrees, or between about 10 degrees to about 30 degrees or less. In some cases, the first light collection optics 105 and the dichroic plate 130 can be fabricated such that each of the first, the second, and the third output collimation angles θ1o, θ2o, θ3o can be the same, and also substantially equal to the respective input collimation angles. In one particular embodiment, each of the input collimation angles ranges from about 60 to about 70 degrees, and each of the output collimation angles also ranges from about 60 to about 70 degrees.

Figure 4A:
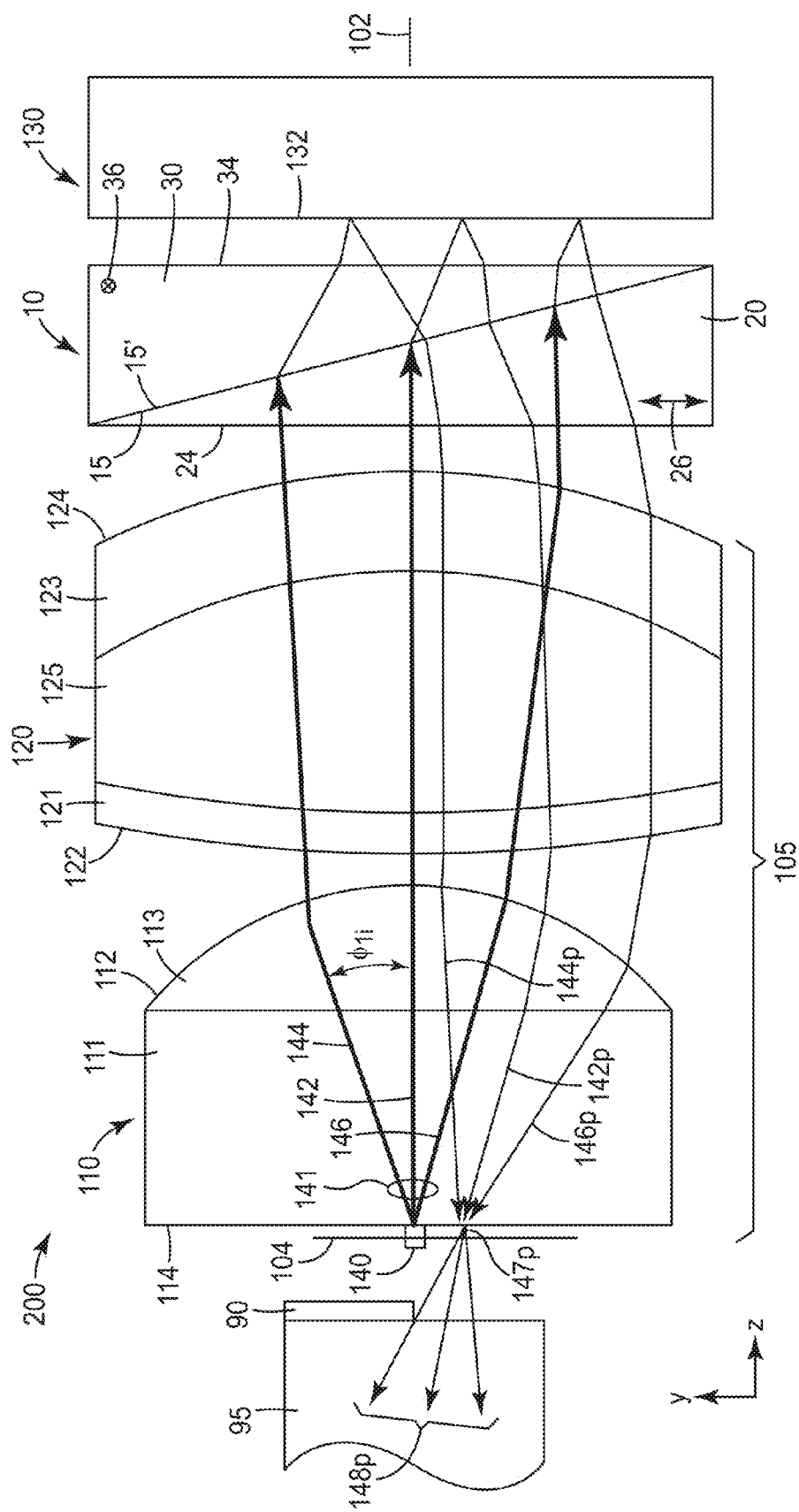
FIGS. 4A-4B shows a cross-section schematic of a color combiner.
Figure 4B:
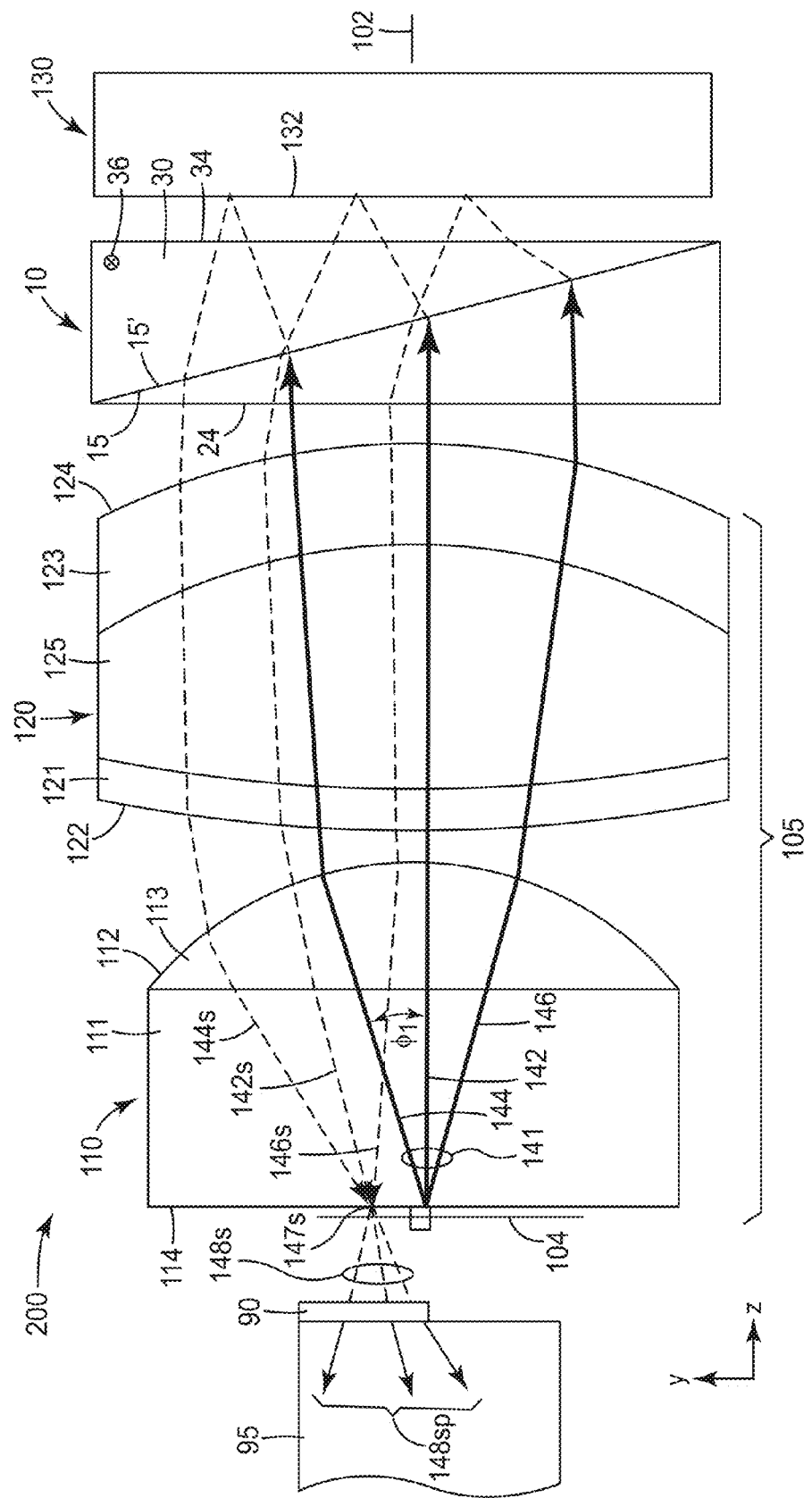

FIGS. 4A-4B shows a cross-section schematic of the polarized color combiner 200 viewed perpendicular to the Y-Z plane of a Cartesian coordinate system, according to one aspect of the disclosure. In the Y-Z plane view of the polarized color combiner 200, the color combining is not visible, since this combining occurs in the X-Z plane. In the X-Z plane views provided in FIGS. 3A-3C, the color combination is visible, and the polarization splitting is not visible. It is to be understood that the separation of the polarized color combiner into separately viewed optical paths through FIGS. 3A-3C and FIGS. 4A-4B is for clarity of illustration purposes only, and the separation of colored unpolarized light beams into orthogonal polarizations and the combination of colored unpolarized light beams into a combined color beam occur simultaneously. For brevity, only the path of the first color light 141 from the first unpolarized light source 140 will be described; however, it will be apparent to one of skill in the art that the path of the other colors of light will be similar.

Turning to FIG. 4A, the path of a first polarization component of first color light 148p of the first color light 141 from first unpolarized light source 140 can be traced through polarized color combiner 200. As described elsewhere, the first polarization direction can be designated as "p–" polarization, and the second polarization direction can be designated as "s–" polarization, as known in the art. First unpolarized light source 140 includes a first color central light ray 142 travelling in the light propagation direction along the optical axis 102, and a cone of first color light 141 within first unpolarized input light collimation angle θ1i, the boundaries of which are represented by first color boundary light rays 144, 146. The first color central light ray 142 is injected from first unpolarized light source 140 into light input surface 114 in a direction generally parallel to the optical axis 102, passes through first lens element 110, second lens element 120, and enters optical device 10 through second prism face 24. As can be seen from FIG. 4A, the first light collection optics 105 serve to collimate the first color light 141 passing from the first unpolarized light source 140 to the optical device 10.

The first color central light ray 142 passes through first birefringent prism 20 and is refracted as it passes through diagonal first and second prism faces 15, 15' into second birefringent prism 30. The first polarization component of first color central light ray 142p, being orthogonal to the second polarization direction 36 (that is, the fast-axis) causes the light to deviate from the unpolarized light propagation direction (along optical axis 102) as described elsewhere. The first polarization component of first color central light ray 142p then passes through fourth prism surface 34 and reflects from first dichroic reflector 132 of dichroic plate 130.

Each of the first color boundary light rays 144, 146 are injected into the light input surface 114 in a direction generally at the unpolarized input light collimation angle θ1i to the optical axis 102, pass through first lens element 110, second lens element 120, and enter optical device 10 through second prism face 24. The first color boundary light rays 144, 146 pass through first birefringent prism 20 and are refracted as they pass through diagonal first and second prism faces 15, 15' into second birefringent prism 30. The first polarization component of first color boundary light rays 144p, 146p, being orthogonal to the second polarization direction 36 (that is, the fast-axis) causes the light to deviate from the unpolarized light propagation direction (along optical axis 102) as described elsewhere. The first polarization component of first color boundary light rays 144p, 146p, then passes through fourth prism surface 34 and reflects from first dichroic reflector 132 of dichroic plate 130, such that the reflected beams are generally parallel to the optical axis 102 as shown.

Each of the first polarization components of first color central and boundary light rays 142p, 144p, 146p, reflect from the first dichroic reflector 132 and travel back through the first light collection optics 105 as collimated light rays parallel to the optical axis 102. The first polarization components of first color central and boundary light rays 142p, 144p, 146p, collectively form a first polarization direction first color output light beam 148p that can converge on a first polarization light ray focal point 147p. The first polarization direction first color output light beam 148p can then be made more uniform by being directed into a light integrating rod 95, as known to one of skill in the art.

Turning to FIG. 4B, the path of a second polarization component of first color light 148s of the first color light 141 from first unpolarized light source 140 can be traced through polarized color combiner 200. The path of the first color central, first boundary, and second boundary light rays 142, 144, 146, from the first unpolarized light source 140 has already been traced through to the diagonal first and second prism faces 15, 15'. The second polarization component of first color central light ray 142s, being parallel to the second polarization direction 36 (that is, the fast-axis) causes the light to deviate from the unpolarized light propagation direction (along optical axis 102) as described elsewhere. The second polarization component of first color central light ray 142s then passes through fourth prism surface 34 and reflects from first dichroic reflector 132 of dichroic plate 130.

The second polarization component of first color boundary light rays 144s, 146s, being parallel to the second polarization direction 36 (that is, the fast-axis) causes the light to deviate from the unpolarized light propagation direction (along optical axis 102) as described elsewhere. The second polarization component of first color boundary light rays 144s, 146s, then passes through fourth prism surface 34 and reflects from first dichroic reflector 132 of dichroic plate 130, such that the reflected beams are generally parallel to the optical axis 102 as shown.

Each of the second polarization component of first color central and boundary light rays 142s, 144s, 146s, reflect from the first dichroic reflector 132 and travel back through the first light collection optics 105 as collimated light rays parallel to the optical axis 102. The second polarization component of first color central and boundary light rays 142s, 144s, 146s, collectively form a second polarization direction output second color light beam 148s that can converge on a second polarization first color light ray focal point 147s. The second polarization direction first color output light beam 148s can then pass through a half-wave retarder 90, such that the second polarization direction output first color light beam 148s rotates to the first polarization direction (that is, the same as first polarization direction output light beam 81p), and becomes rotated second polarization direction first color output light beam 148sp. The rotated second polarization direction first color output light beam 148sp can then be made more uniform by being directed into a light integrating rod 95, as known to one of skill in the art.

As shown by FIGS. 4A-4B, input first color light beam 141 becomes a first polarization direction polarized first color output light beam that includes first polarization direction first color output light beam 148p and rotated second polarization direction output first color light beam 148sp. In one particular embodiment, the half-wave retarder 90 can be disposed such that the second polarization light ray focal point 147s is positioned at the half-wave retarder 90, and an improvement in efficiency of the polarized color combiner 200 can result.

Figure 5:
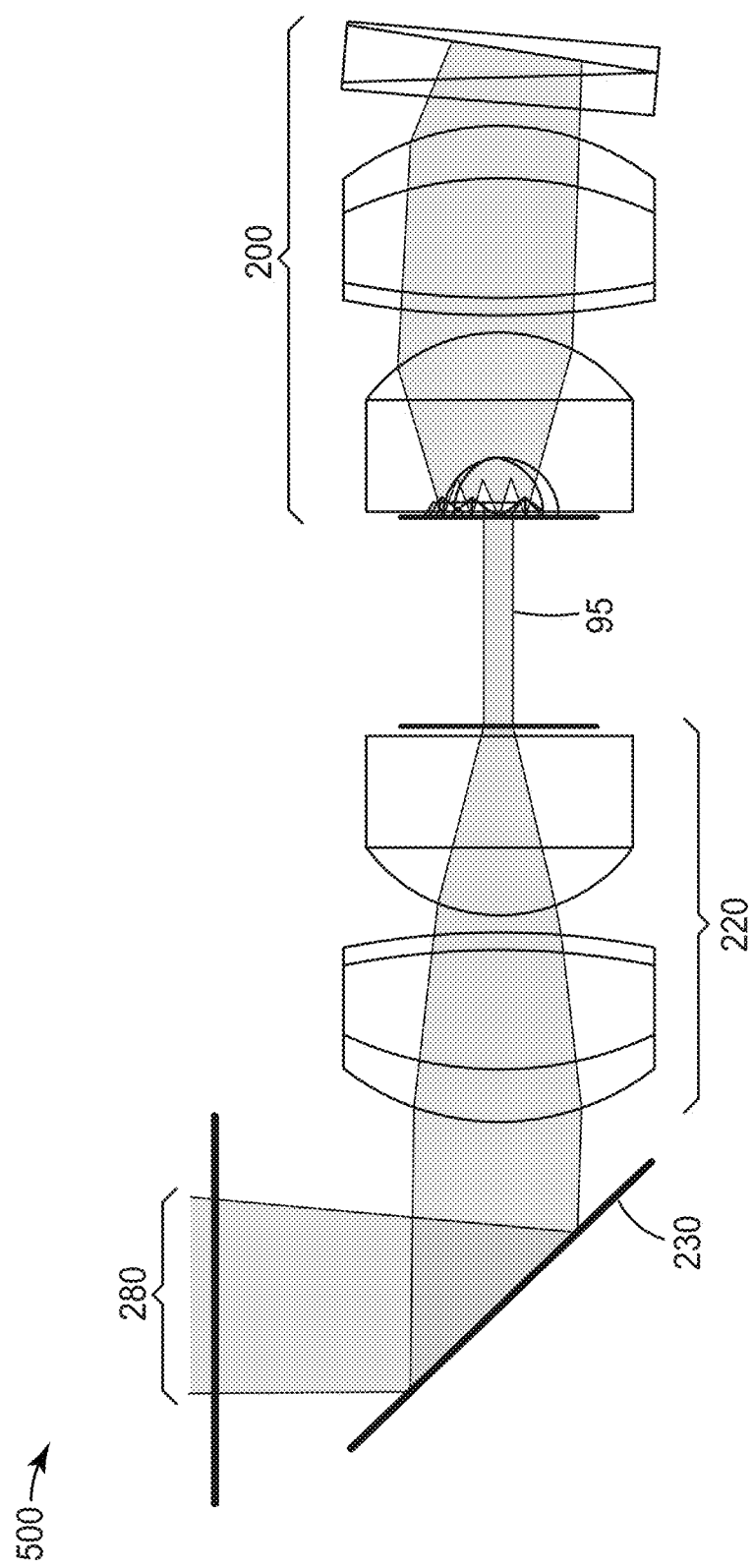
FIG. 5 shows a cross-section schematic of a color combiner system.

FIG. 5 shows a cross-section schematic of a polarized color combiner system 500 according to one aspect of the disclosure. In FIG. 5, a polarized color combiner 200 as described with reference to FIGS. 3A-3C is paired with a second light collection optics 220 such that the output of the polarized color combiner 200 enters an integrating rod 95 (or a light homogenization tunnel 95) where the polarized colors are further mixed, and is input into the second light collection optics 220. The second light collection optics 220 can be similar to the first light collection optics 105 described previously, and can serve to be a light collimator which expands the combined polarized color light output. In some embodiments, the combined polarized color light output having the first, the second, and the third output collimation angles θ1o, θ2o, θ3o as described previously, can be expanded to a color combined collimated polarized light 280 which has been reflected from an optional broadband mirror 230. The color combined collimated polarized light 280 includes light having a small divergence angle that can be less than about 20 degrees, or less than about 15 degrees, or even less than about 12 degrees.

Figure 6:
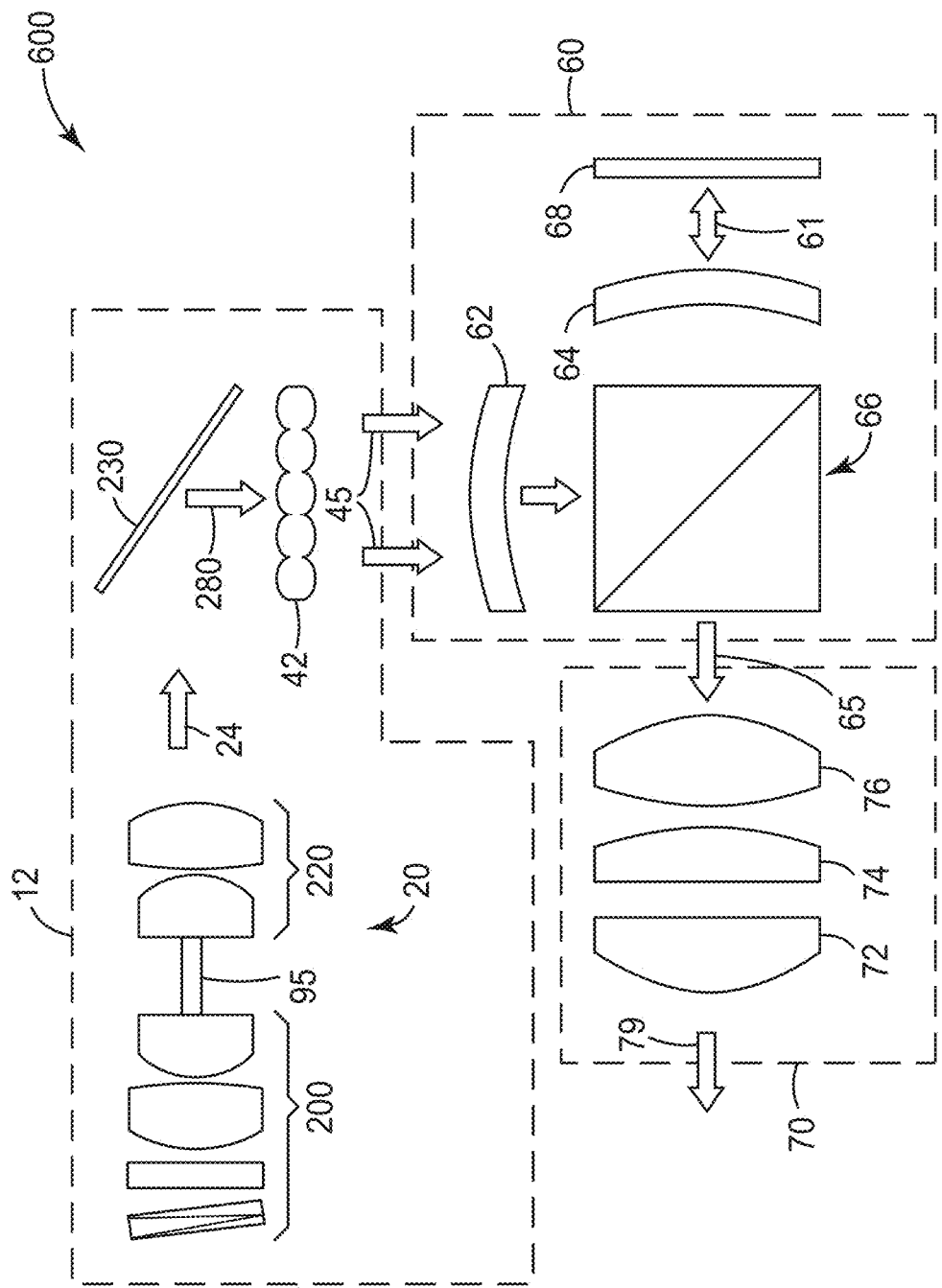
FIG. 6 shows a schematic diagram of an image projector.

FIG. 6 shows a schematic diagram of an image projector 600, according to one aspect of the disclosure. Image projector 600 includes a polarized color combiner module 12 that is capable of injecting a partially collimated combined color polarized light output 24 onto a reflector 230 to direct a partially collimated combined color polarized light output 280 toward an optional fly-eye combiner array 42, where the partially collimated combined color polarized light output 280 becomes converted to a homogenized polarized light 45 that enters an image generator module 60. The image generator module 60 outputs an imaged light 65 that enters a projection module 70 where the imaged light 65 becomes a projected imaged light 79.

In one aspect, color combiner module 12 includes different wavelength spectrum input light sources that are input through a polarized color combiner 200, as described elsewhere. The polarized color combiner 200 produces a combined polarized light output that includes the different wavelength spectrum lights passing through a light homogenization tunnel 95. The combined light output passing through light homogenization tunnel 95 then passes through a second light collection optics 220 and exits color combiner module 12 as partially collimated combined color polarized light output 24, as described elsewhere.

In one aspect, the input light sources are unpolarized, and the partially collimated combined color light output 24 is polarized. The partially collimated combined color polarized light output 24 can be a polychromatic combined light that comprises more than one wavelength spectrum of light. The partially collimated combined color polarized light output 24 can be a time sequenced output of each of the received lights. In one aspect, each of the different wavelength spectra of light corresponds to a different color light (for example red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

According to one aspect, each input light source comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors. Light sources, light collimators, lenses, and light integrators useful in the present invention are further described, for example, in Published U.S. Patent Application No. US 2008/0285129, the disclosure of which is herein included in its entirety.

The optional fly-eye combiner array 42 can include a monolithic array of lenses, such as a optional monolithic fly-eye array (FEA) of lenses, described elsewhere, that can homogenize and improve the uniformity of the partially collimated combined color polarized light output 280. Representative arrangements of optional FEA are described, for example, in co-pending U.S. Patent Ser. No. 61/346,183 entitled FLY EYE INTEGRATOR POLARIZATION CONVERTER; 61/346,190 entitled POLARIZED PROJECTION ILLUMINATOR, filed May 19, 2010); and 61/346,193 entitled COMPACT ILLUMINATOR, filed May 19, 2010). In some cases, either an integrating tunnel or rod (for example, light homogenization tunnel 95), or an FEA (for example, ply-eye combiner array 42) could be used for homogenization, but both techniques generally would not be used together.

In one aspect, image generator module 60 includes a polarizing beam splitter (PBS) 66, representative imaging optics 62, 64, and a spatial light modulator 68 that cooperate to convert the homogenized polarized light 45 into an imaged light 65. Suitable spatial light modulators (that is, image generators) have been described previously, for example, in U.S. Pat. No. 7,362,507 (Duncan et al.), U.S. Pat. No. 7,529,029 (Duncan et al.); in U.S. Publication No. 2008-0285129-A1 (Magarill et al.); and also in PCT Publication No. WO2007/016015 (Duncan et al.). In one particular embodiment, homogenized polarized light 45 is a divergent light originating from each lens of the optional FEA. After passing through imaging optics 62, 64 and PBS 66, homogenized polarized light 45 becomes imaging light 61 that uniformly illuminates the spatial light modulator 68. In one particular embodiment, each of the divergent light ray bundles from each of the lenses in the optional FEA illuminates a major portion of the spatial light modulator 68 so that the individual divergent ray bundles overlap each other.

In one aspect, projection module 70 includes representative projection optics 72, 74, 76, that can be used to project imaged light 65 as projected light 79. Suitable projection optics 72, 74, 76 have been described previously, and are well known to those of skill in the art.

Following are a list of embodiments of the present disclosure.

Item 1 is a polarization converter, comprising: a first light collection optics having a light input surface and an optical axis; an unpolarized light source capable of injecting an unpolarized light beam into the light input surface along a first propagation direction parallel to the optical axis; an optical device comprising a birefringent prism, the optical device disposed facing the first light collection optics and opposite the light input surface, wherein the optical device is capable of splitting the unpolarized light beam into a first polarized light beam and a second polarized light beam having orthogonal polarization states, at least one of the first and second polarized light beams diverging from the first propagation direction; a reflector disposed to reflect the first and second polarized light beams back through the optical device and the first light collection optics, toward the light input surface, wherein the first polarized light beam passes through the light input surface at a first position displaced from the unpolarized light source, and the second polarized light beam passes through the light input surface at a second position displaced from the first position and the unpolarized light source.

Item 2 is the polarization converter of claim 1, further comprising a half-wave retarder disposed adjacent the light input surface, capable of converting a first polarization state of the first polarized light beam to a second polarization state such that a combined polarized output light is polarized in the second polarization state.

Item 3 is the polarization converter of claim 1, further comprising an optical integrator disposed to accept the first and the second polarized light beams.

Item 4 is the polarization converter of item 1 to item 3, wherein the first light collection optics comprises light collimation optics.

Item 5 is the polarization converter of item 1 to item 4, wherein the light collimation optics comprises a one lens design, a two lens design, a diffractive optical element, or a combination thereof.

Item 6 is the polarization converter of item 1 to item 5, wherein each of the unpolarized light beam, the first polarized light beam, and the second polarized light beam includes a light divergence angle.

Item 7 is the polarization converter of item 1 to item 6, wherein the first light collection optics comprises: a first lens having a first convex surface opposite the light input surface;

and a second lens having a second surface facing the first convex surface, and a third convex surface opposite the second surface.

Item 8 is the polarization converter of item 1 to item 7, wherein the optical device comprises a Wollaston prism, a Senarmont prism, a Nicol prism, a Rochon prism, a Nomarski prism, a Glan-Thompson prism, a Glan-Foucault prism, or a combination thereof.

Item 9 is the polarization converter of item 1 to item 8, wherein the reflector comprises a broadband mirror.

Item 10 is the polarization converter of item 2, wherein the combined polarized output light transmits to a second light collection optics, the second light collection optics expanding the combined polarized output light to become an expanded polarized light beam having a small divergence angle.

Item 11 is the polarization converter of item 10, wherein the second light collection optics comprises: a third lens centered on the optical axis having a fourth convex surface and a second light input surface opposite the fourth convex surface, capable of transmitting light exiting the light input surface to the second light input surface; and a fourth lens centered on the optical axis, the fourth lens having a fifth surface facing the fourth convex surface, and a sixth convex surface opposite the fifth surface, wherein light entering the second light input surface exits the sixth convex surface as the expanded polarized light beam.

Item 12 is the polarization converter of item 10 or item 11, wherein the small divergence angle comprises an angle less than about 15 degrees.

Item 13 is a polarization converting color combiner, comprising the polarization converter of item 1 to item 12, wherein the unpolarized light source comprises a first color light source capable of emitting a first color light and a second color light source capable of emitting a second color light, each displaced from the optical axis, and the reflector comprises a dichroic plate.

Item 14 is the polarization converting color combiner of item 13, wherein the dichroic plate comprises: a first dichroic reflector capable of reflecting the first color light and transmitting other color light; and a second reflector capable of reflecting the second color light, wherein the first dichroic reflector and the second reflector are each tilted such that the first and the second color light are both reflected to exit through the light input surface along the optical axis, as a combined color light beam.

Item 15 is the polarization converting color combiner of item 13 or item 14, wherein the second reflector comprises a broadband mirror.

Item 16 is the polarization converting color combiner of item 13 or item 14, wherein the second reflector comprises a second dichroic reflector capable of reflecting the second color light and transmitting other colors of light.

Item 17 is the polarization converting color combiner of item 13 to item 16, further comprising a third color light source displaced from the optical axis and disposed to inject a third color light into the light input surface, wherein the dichroic plate further comprises a third reflector capable of reflecting the third color light to exit through the light input surface along the optical axis.

Item 18 is the polarization converting color combiner of item 17, wherein the third reflector comprises a broadband mirror.

Item 19 is the polarization converting color combiner of item 17, wherein the third reflector comprises a third dichroic reflector capable of reflecting the third color light and transmitting other colors of light.

Item 20 is an image projector, comprising: the polarization converter of item 2 to item 12; a spatial light modulator disposed to impart an image to the combined polarized output light; and projection optics.

Item 21 is an image projector, comprising: the polarization converting color combiner of item 17 to item 19; a spatial light modulator disposed to impart an image to the polarized first, second, and third color light; and projection optics.

Item 22 is the image projector of item 20 or item 21, wherein the spatial light modulator comprises a liquid crystal on silicon (LCoS) imager or a transmissive liquid crystal display (LCD).

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A polarization converter, comprising:
    a first light collection optics having a light input surface and an optical axis;
    an unpolarized light source capable of injecting an unpolarized light beam into the light input surface along a first propagation direction parallel to the optical axis;
    an optical device comprising a birefringent prism, the optical device disposed facing the first light collection optics and opposite the light input surface,
    wherein the optical device is capable of splitting the unpolarized light beam into a first polarized light beam and a second polarized light beam having orthogonal polarization states, at least one of the first and second polarized light beams diverging from the first propagation direction; and
    a reflector disposed to reflect the first and second polarized light beams back through the optical device and the first light collection optics, toward the light input surface,
    wherein the first polarized light beam passes through the light input surface at a first position displaced from the unpolarized light source, and the second polarized light beam passes through the light input surface at a second position displaced from the first position and the unpolarized light source.

2. The polarization converter of claim 1, further comprising a half-wave retarder disposed adjacent the light input surface, capable of converting a first polarization state of the first polarized light beam to a second polarization state such that a combined polarized output light is polarized in the second polarization state.

3. The polarization converter of claim 2, wherein the combined polarized output light transmits to a second light collection optics, the second light collection optics expanding the combined polarized output light to become an expanded polarized light beam having a small divergence angle.

4. The polarization converter of claim 3, wherein the second light collection optics comprises:
   a third lens centered on the optical axis having a fourth convex surface and a second light input surface opposite the fourth convex surface, capable of transmitting light exiting the light input surface to the second light input surface; and
   a fourth lens centered on the optical axis, the fourth lens having a fifth surface facing the fourth convex surface, and a sixth convex surface opposite the fifth surface,
   wherein light entering the second light input surface exits the sixth convex surface as the expanded polarized light beam.

5. The polarization converter of claim 3, wherein the small divergence angle comprises an angle less than about 15 degrees.

6. An image projector, comprising:
   the polarization converter of claim 2;
   a spatial light modulator disposed to impart an image to the combined polarized output light; and
   projection optics.

7. The polarization converter of claim 1, further comprising an optical integrator disposed to accept the first and the second polarized light beams.

8. The polarization converter of claim 1, wherein the first light collection optics comprises light collimation optics.

9. The polarization converter of claim 8, wherein the light collimation optics comprises a one lens design, a two lens design, a diffractive optical element, or a combination thereof.

10. The polarization converter of claim 1, wherein each of the unpolarized light beam, the first polarized light beam, and the second polarized light beam includes a light divergence angle.

11. The polarization converter of claim 1, wherein the first light collection optics comprises:
   a first lens having a first convex surface opposite the light input surface; and
   a second lens having a second surface facing the first convex surface, and a third convex surface opposite the second surface.

12. The polarization converter of claim 1, wherein the optical device comprises a Wollaston prism, a Senarmont prism, a Nicol prism, a Rochon prism, a Nomarski prism, a Glan-Thompson prism, a Glan-Foucault prism, or a combination thereof.

13. The polarization converter of claim 1, wherein the reflector comprises a broadband mirror.

14. A polarization converting color combiner, comprising the polarization converter of claim 1, wherein the unpolarized light source comprises a first color light source capable of emitting a first color light and a second color light source capable of emitting a second color light, each displaced from the optical axis, and the reflector comprises a dichroic plate.

15. The polarization converting color combiner of claim 14, wherein the dichroic plate comprises:
   a first dichroic reflector capable of reflecting the first color light and transmitting other color light; and
   a second reflector capable of reflecting the second color light,
   wherein the first dichroic reflector and the second reflector are each tilted such that the first and the second color light are both reflected to exit through the light input surface along the optical axis, as a combined color light beam.

16. The polarization converting color combiner of claim 15, wherein the second reflector comprises a broadband mirror.

17. The polarization converting color combiner of claim 15, wherein the second reflector comprises a second dichroic reflector capable of reflecting the second color light and transmitting other colors of light.

18. The polarization converting color combiner of claim 14, further comprising a third color light source displaced from the optical axis and disposed to inject a third color light into the light input surface, wherein the dichroic plate further comprises a third reflector capable of reflecting the third color light to exit through the light input surface along the optical axis.

19. The polarization converting color combiner of claim 18, wherein the third reflector comprises a broadband mirror.

20. The polarization converting color combiner of claim 18, wherein the third reflector comprises a third dichroic reflector capable of reflecting the third color light and transmitting other colors of light.

* * * * *